US012334003B2

(12) United States Patent
Lin

(10) Patent No.: US 12,334,003 B2
(45) Date of Patent: Jun. 17, 2025

(54) PIXEL CIRCUIT

(71) Applicant: AUO Corporation, Hsinchu (TW)

(72) Inventor: Wei-Li Lin, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/748,063

(22) Filed: Jun. 19, 2024

(65) Prior Publication Data

US 2025/0095553 A1 Mar. 20, 2025

(30) Foreign Application Priority Data

Sep. 20, 2023 (TW) ................................ 112135786

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/08* (2013.01); *G09G 2320/02* (2013.01)

(58) Field of Classification Search
CPC .. G09G 3/3266; G09G 3/3258; G09G 3/3291; G09G 3/3696; G09G 3/3688; G09G 3/30; G09G 3/3208; G09G 3/36; G09G 3/20; G09G 3/3225; G09G 3/3275; G09G 2300/0819; G09G 2300/0861; G09G 2300/0842; G09G 2300/0852; G09G 2300/0426; G09G 2300/043; G09G 2300/0814; G09G 2300/0876; G09G 2300/0866; G09G 2320/0233; G09G 2320/043; G09G 2320/0223; G09G 2320/0219; G09G 2320/045; G09G 2320/0247; G09G 2310/0251; G09G 2310/08; G09G 2310/0262; G09G 2310/061; G09G 2310/0286; G09G 2330/021

See application file for complete search history.

(56) References Cited

U.S. PATENT DOCUMENTS

2023/0230536 A1* 7/2023 Kim .................... G09G 3/3241 345/55
2023/0252935 A1* 8/2023 Park .................... G09G 3/3233 345/55

FOREIGN PATENT DOCUMENTS

CN 109410841 8/2021

* cited by examiner

*Primary Examiner* — Dong Hui Liang
(74) *Attorney, Agent, or Firm* — JCIPRNET

(57) ABSTRACT

A pixel circuit is provided. A reader reads a first data voltage and a threshold voltage of a target compensation transistor on a current path of a driving current in a light-emitting driver to a control terminal of the target compensation transistor during a read period. During a light-emitting period, the reader uses a second data voltage to compensate the control terminal of the target compensation transistor, which ensures that the driving current is only related to the first data voltage. The second data voltage is twice voltage value of the first data voltage.

7 Claims, 3 Drawing Sheets

PIXEL CIRCUIT

CROSS-REFERENCE TO RELATED APPLICATION

This application claims the priority benefit of Taiwan application serial no. 112135786, filed on Sep. 20, 2023. The entirety of the above-mentioned patent application is hereby incorporated by reference herein and made a part of this specification.

BACKGROUND

Technical Field

The disclosure relates to an electronic device, and particularly relates to a pixel circuit.

Description of Related Art

In today's technical field, a pixel circuit may control light-emitting elements to emit light in a multi-emission manner and perform brightness and grayscale adjustments through a pulse width modulation technology and a pulse amplitude modulation technology. Generally, in a pulse amplitude modulation circuit, a driving current of a light-emitting element is often controlled based on a data voltage and a direct current (DC) reference voltage. However, in this case, stability of the DC reference voltage may directly affect light-emitting stability of the light-emitting element, and thus affects display quality of the pixel circuit.

SUMMARY

The disclosure is directed to a pixel circuit, which is adapted to effectively improve display quality of the pixel circuit.

The disclosure provides a pixel circuit including a light-emitting element, a light-emitting driver, a data input device, and a reader. The light-emitting driver is coupled to the light-emitting element and provides a driving current to drive the light-emitting element. The data input device is coupled to the light-emitting driver and provides a first data voltage. The reader reads a second data voltage during a read period, and reads the first data voltage and a threshold voltage of a target compensation transistor on a current path of the driving current in the light-emitting driver to a control terminal of the target compensation transistor, so as to perform voltage compensation on the control terminal of the target compensation transistor. During a light-emitting period, the reader uses the second data voltage to perform voltage compensation on the control terminal of the target compensation transistor, which ensures that the driving current is only related to the first data voltage. A voltage value of the second data voltage is twice of a voltage value of the first data voltage.

According to the above description, the reader of the disclosure is adapted to read the first data voltage and the threshold voltage of the target compensation transistor on the current path of the driving current in the light-emitting driver to the control terminal of the target compensation transistor, so as to perform voltage compensation on the control terminal of the target compensation transistor. During a light-emitting period, the reader uses the second data voltage to perform voltage compensation on the control terminal of the target compensation transistor, which ensures that the driving current is only related to the first data voltage, where the voltage value of the second data voltage is twice of the voltage value of the first data voltage. In this way, the driving current of the light-emitting element is only related to the first data voltage and is not affected by other voltages, which effectively improves the display quality of the pixel circuit.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
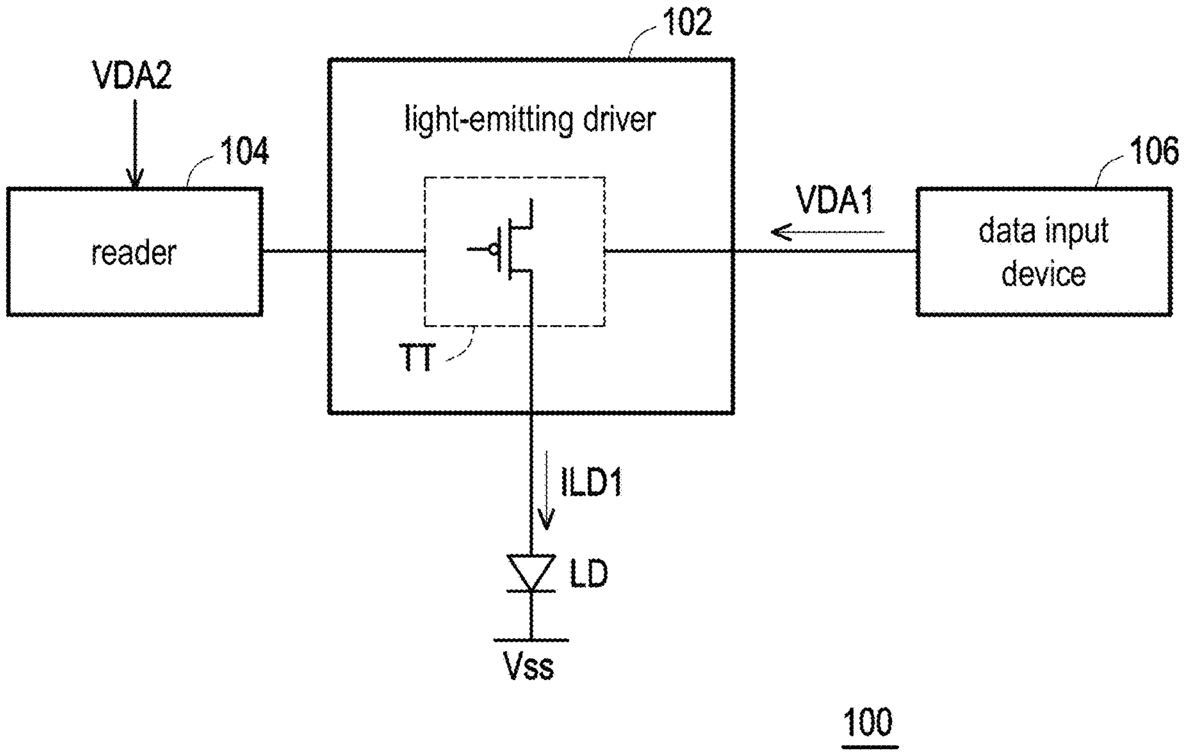
FIG. 1 is a schematic diagram of a pixel circuit according to an embodiment of the disclosure.

Referring to FIG. 1, FIG. 1 is a schematic diagram of a pixel circuit according to an embodiment of the disclosure. The pixel circuit 100 includes a light-emitting element LD, a light-emitting driver 102, a reader 104, and a data input device 106. The light-emitting element LD may be, for example, a light-emitting diode, where an anode thereof is coupled to the light-emitting driver 102, and a cathode of the light-emitting element LD is coupled to a reference ground voltage VSS, the light-emitting driver 102 is coupled to the reader 104 and the data input device 106.

The light-emitting driver 102 may provide a driving current ILD1 through a driving current path to drive the light-emitting element LD, where a target compensation transistor TT is included on the driving current path. The data input device 106 may be configured to provide a first data voltage VDA1. The reader 104 may read a second data voltage VDA2 during a read period, and read the first data voltage VDA1 and a threshold voltage of the target compensation transistor TT on the driving current path to a control terminal of the target compensation transistor TT, so as to perform voltage compensation on the control terminal of the target compensation transistor TT, where a voltage value of the second data voltage VDA2 is twice of a voltage value of the first data voltage VDA1. In addition, during a light-emitting period, the reader 104 uses the second data voltage VDA2 to perform voltage compensation on the control terminal of the target compensation transistor TT, which ensures that the driving current ILD1 is only related to the first data voltage VDA1.

By using the threshold voltage of the target compensation transistor TT and the second data voltage VDA2 to perform voltage compensation on the control terminal of the target compensation transistor TT, the driving current ILD1 of the light-emitting element LD may only be related to the first data voltage VDA1, and is not affected by other voltages, which effectively improves display quality of the pixel circuit 100.

Figure 2:
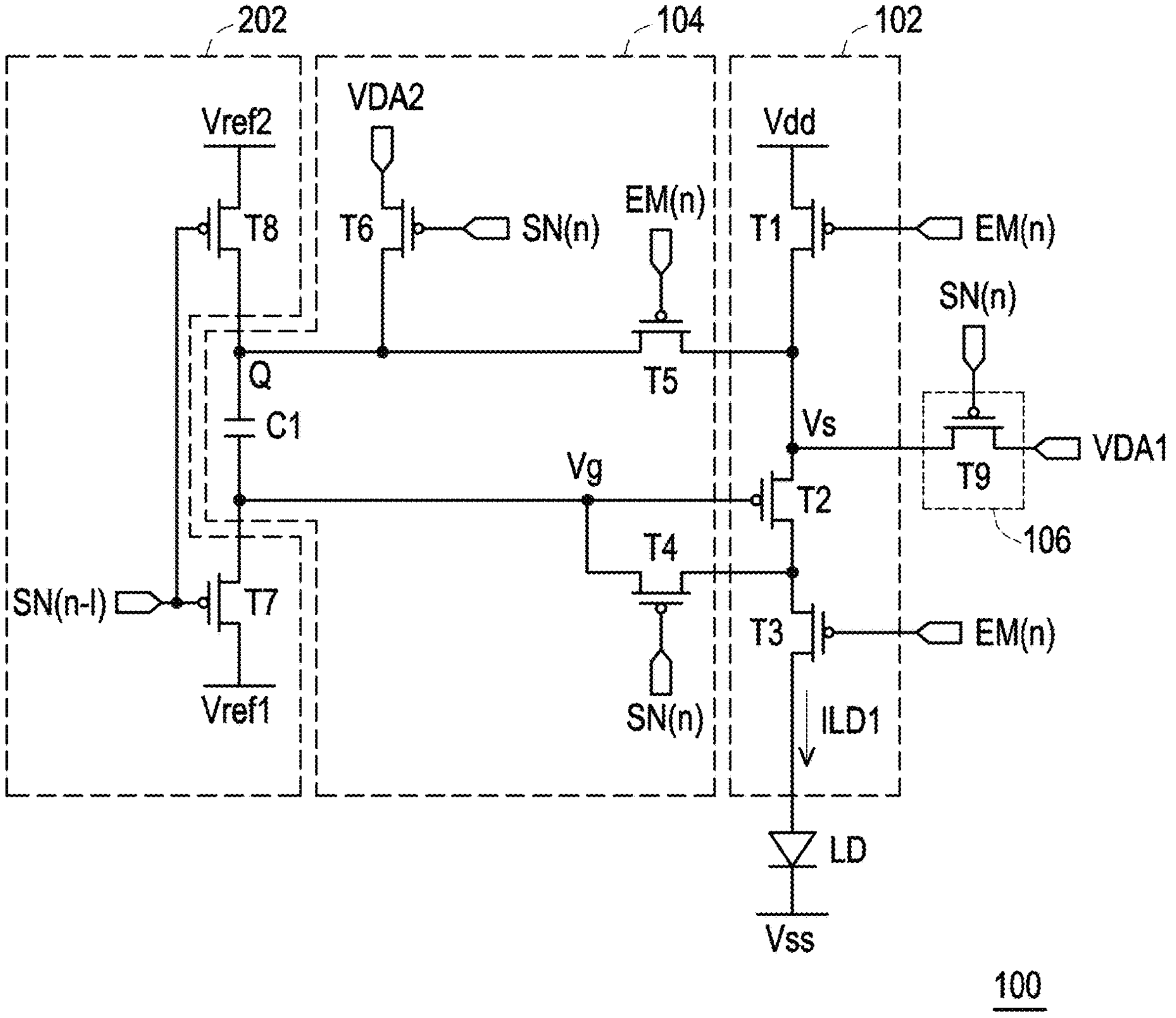
FIG. 2 is a schematic diagram of a pixel circuit according to another embodiment of the disclosure.

Furthermore, an implementation of the pixel circuit 100 may be as shown in FIG. 2. In the embodiment of FIG. 2, the light-emitting driver 102 includes transistors T1-T3, the reader 104 includes transistors T4-T6 and a capacitor C1, and the data input device 106 includes a transistor T9. In addition, in the embodiment, the pixel circuit 100 may further include a resetter 202 coupled to the reader 104. The resetter 202 may include transistors T7 and T8.

In the light-emitting driver 102, the transistors T1 to T3 are connected in series between a power supply voltage Vdd and the light-emitting element LD, where the transistor T2 is used as the target compensation transistor TT in the embodiment of FIG. 1, and control terminals of the transistors T1 and T3 are used to receive a light-emitting control signal EM(n), and a control terminal of the transistor T2 is coupled to the reader 104. In the reader 104, the transistor T4 is coupled between the control terminal of the transistor T2 and a common node of the transistors T2 and T3. A first terminal of the transistor T5 is coupled to a common node of the transistors T1 and T2. A control terminal of the transistor T5 receives the light-emitting control signal EM(n). The capacitor C1 is coupled between a second terminal of the transistor T5 and the control terminal of the transistor T2. A first terminal of the transistor T6 receives the second data voltage VDA2, a second terminal of the transistor T6 is coupled to the second terminal of the transistor T5, and a control terminal of the transistor T6 receives a scan signal SN(n). In the data input device 106, a first terminal of the transistor T9 receives the first data voltage VDA1, a second terminal of the transistor T9 is coupled to the common node of the transistor T1 and the transistor T2, and a control terminal of the transistor T9 receives the scan signal SN(n). In addition, in the resetter 202, the transistor T7 is coupled between the control terminal of the transistor T2 and a reference voltage Vref1, and a control terminal of the transistor T7 receives a previous stage scan signal SN(n-1). The transistor T8 is coupled between the second terminal of the transistor T5 and a reference voltage Vref2, and a control terminal of the transistor T8 receives the previous stage scan signal SN(n-1).

Figure 3:
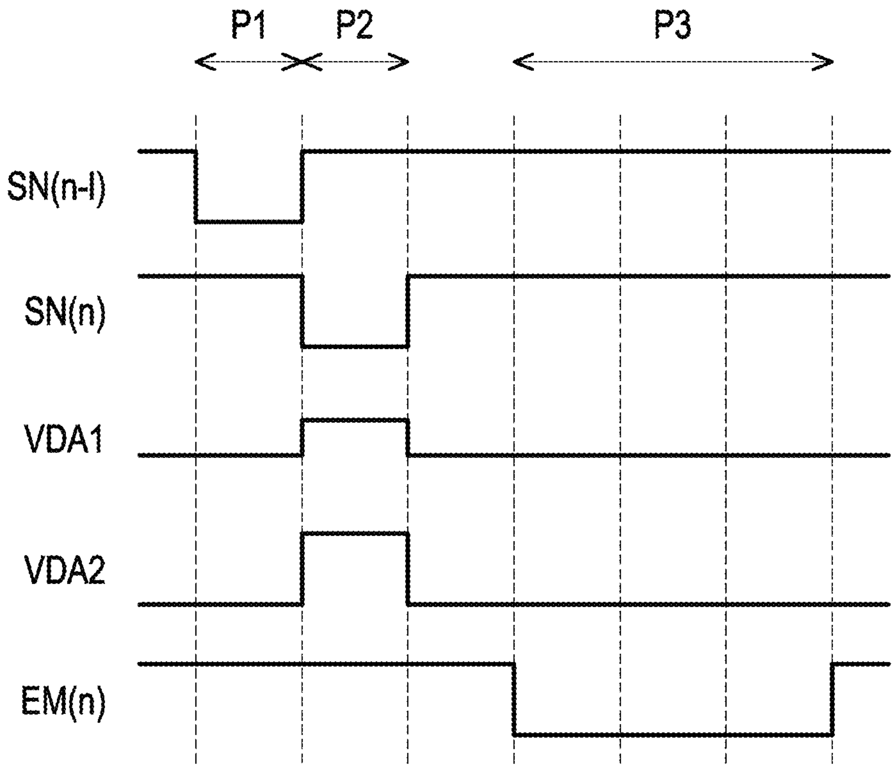
FIG. 3 is an operation waveform diagram of a pixel circuit according to an embodiment of the disclosure.

An operation waveform of the pixel circuit 100 of the embodiment of FIG. 2 may be as shown in FIG. 3. During a reset period P1, the transistors T7 and T8 are turned on under control of the previous stage scan signal SN(n-1), and the transistors T4, T6, and T9 are turned off under control of the scan signal SN(n). The transistors T1, T3, and T5 are turned off under control of the light-emitting control signal EM(n). Therefore, during the reset period P1, a voltage of a node Q is equal to the reference voltage Vref2, a voltage of the control terminal of the transistor T2 is equal to the reference voltage Vref1, and the transistor T2 is turned on by the reference voltage Vref1.

During the read period P2, the previous stage scan signal SN(n-1) changes from a low voltage level to a high voltage level. The scan signal SN(n) changes from the high voltage level to the low voltage level. The first data voltage VDA1 and the second data voltage VDA2 change from the low voltage level to the high voltage level. The light-emitting control signal EM(n) remains at the high voltage level. The transistors T7 and T8 are accordingly changed from a turn-on state to a turn-off state. The transistors T4, T6, and T9 are changed from the turn-off state to the turn-on state. At this time, the second data voltage VDA2 is read to the node Q shown in FIG. 2, so that the voltage of the node Q is equal to the second data voltage VDA2. The first data voltage VDA1 and a threshold voltage |Vth| of the transistor T2 are read to the control terminal of the transistor T2 through the transistor T4, so that a voltage Vg of the control terminal of transistor T2 is compensated by the threshold voltage |Vth| of the transistor T2, and the voltage Vg of the control terminal of the transistor T2 is equal to the first data voltage VDA1 minus the threshold voltage |Vth| of the transistor T2, i.e., Vg=VDA1−|Vth|. In addition, a source voltage Vs of the transistor T2 is equal to the first data voltage VDA1.

During a light-emitting period P3, the light-emitting control signal EM(n) changes from the high voltage level to the low voltage level, the scan signal SN(n) and the previous stage scan signal SN(n-1) remain at the high voltage level, and the first data voltage VDA1 and the second data voltage VDA2 remain at the low voltage level. Therefore, the transistors T4, T6, and T9 are in the turn-off state, and the transistors T1, T3, and T5 are changed from the turn-off state to the turn-on state. At this time, the voltage of the node Q shown in FIG. 2 is equal to the power supply voltage Vdd, and the voltage Vg of the control terminal of the transistor T2 is equal to the first data voltage VDA1 minus the threshold voltage |Vth| of the transistor T2 plus the power supply voltage Vdd and minus the second data voltage VDA2, i.e., Vg=VDA1−|Vth|+Vdd−VDA2. In addition, the source voltage Vs of the transistor T2 will be equal to the power supply voltage Vdd. At this time, the current value of the driving current ILD1 may be expressed as:

$$k(Vg-Vs-Vth)^2 = k(VDA1-|Vth|+Vdd-VDA2-Vdd-Vth)^2 = k(VDA1-|Vth|+Vdd-2VDA1-Vdd-Vth)^2 = k(-VDA1)^2 \quad (1)$$

It may be seen from the expression (1) that the driving current ILD1 is only related to the first data voltage VDA1 at this time, and is non-related to other voltages (such as the power supply voltage Vdd, the threshold voltage Vth, the reference voltages Vref1, Vref2), so as to ensure that the luminescence of the light-emitting element LD is not affected by stability of other voltages, thereby effectively improving the display quality of the pixel circuit.

In summary, the reader of the disclosure is adapted to read the first data voltage and the threshold voltage of the target compensation transistor on the current path of the driving current in the light-emitting driver to the control terminal of the target compensation transistor, so as to perform voltage compensation on the control terminal of the target compensation transistor. During the light-emitting period, the reader uses the second data voltage to perform voltage compensation on the control terminal of the target compensation transistor, which ensures that the driving current is only related to the first data voltage, where the voltage value of the second data voltage is twice of the voltage value of the first data voltage. In this way, the driving current of the light-emitting element is only related to the first data voltage and is not affected by other voltages, which effectively improves the display quality of the pixel circuit.

What is claimed is:

1. A pixel circuit, comprising:

a light-emitting element;

a light-emitting driver, coupled to the light-emitting element, and providing a driving current to drive the light-emitting element;

a data input device, coupled to the light-emitting driver, and providing a first data voltage; and a reader, reading a second data voltage during a read period, and reading the first data voltage and a threshold voltage of a target compensation transistor on a current path of the driving current in the light-emitting driver to a control terminal of the target compensation transistor, so as to perform voltage compensation on the control terminal of the target compensation transistor, wherein during a light-emitting period, the reader performs voltage compensation on the control terminal of the target compensation transistor through the second data voltage, so that the driving current is only related to the first data voltage, wherein a voltage value of the second data voltage is twice of a voltage value of the first data voltage.

2. The pixel circuit according to claim 1, wherein the light-emitting driver comprises:

a first transistor, having a first terminal and a second terminal respectively coupled to a power supply voltage and the data input device, wherein a control terminal of the first transistor receives a light-emitting control signal;

a second transistor, having a first terminal coupled to the data input device, wherein a control terminal of the second transistor is coupled to the reader, wherein the second transistor serves as the target compensation transistor; and a third transistor, coupled between a second terminal of the second transistor and the light-emitting element, wherein a control terminal of the third transistor receives the light-emitting control signal, the first transistor and the third transistor are controlled by the light-emitting control signal, and are turned off during the read period and turned on during the light-emitting period, so as to read the first data voltage and the threshold voltage during the read period, and provide the driving current to drive the light-emitting element during the light-emitting period.

3. The pixel circuit according to claim 2, wherein the reader comprises:

a fourth transistor, coupled between the control terminal and the second terminal of the second transistor, wherein a control terminal of the fourth transistor receives a scan signal;

a fifth transistor, having a first terminal coupled to the second terminal of the first transistor, wherein a control terminal of the fifth transistor receives the light-emitting control signal;

a sixth transistor, coupled between the second data voltage and a second terminal of the fifth transistor, wherein a control terminal of the sixth transistor receives the scan signal; and a capacitor, coupled between the second terminal of the fifth transistor and the control terminal of the second transistor, wherein during the read period, the fourth transistor and the sixth transistor are controlled by the scan signal and turned on, the fifth transistor is controlled by the light-emitting control signal and turned off to read the first data voltage, the threshold voltage and the second data voltage, and during the light-emitting period, the fourth transistor and the sixth transistor are controlled by the scan signal and turned off, and the fifth transistor is controlled by the light-emitting control signal and turned on to perform voltage compensation on the target compensation transistor.

4. The pixel circuit according to claim 3, further comprising:

a resetter, coupled to the reader, and resetting a voltage of the second terminal of the fifth transistor and a voltage of the control terminal of the second transistor during a reset period, so as to turn on the second transistor.

5. The pixel circuit according to claim 4, wherein the resetter comprises:

a seventh transistor, coupled between the control terminal of the second transistor and a first reference voltage, wherein a control terminal of the seventh transistor receives a previous stage scan signal; and an eighth transistor, coupled between the second terminal of the fifth transistor and a second reference voltage, wherein a control terminal of the eighth transistor receives the previous stage scan signal.

6. The pixel circuit according to claim 1, wherein the data input device comprises:

a transistor, coupled between the first data voltage and the light-emitting driver, wherein a control terminal of the transistor receives a scan signal and is turned on during the read period and turned off during the light-emitting period.

7. The pixel circuit according to claim 1, wherein the light-emitting element is a light-emitting diode.

* * * * *